(Model.)

S. L. COGGIN.
Harrow and Cultivator.

No. 233,730. Patented Oct. 26, 1880.

Witnesses
Prey Aughe
J. H. McDonald

Inventor:
S. L. Coggin
By J. W. Tallmadge
Att'y

UNITED STATES PATENT OFFICE.

SIMON L. COGGIN, OF OXFORD, MISSISSIPPI.

HARROW AND CULTIVATOR.

SPECIFICATION forming part of Letters Patent No. 233,730, dated October 26, 1880.

Application filed August 17, 1880. (Model.)

*To all whom it may concern:*

Be it known that I, SIMON L. COGGIN, a citizen of the United States, residing at Oxford, in the county of La Fayette and State of Mississippi, have invented certain new and useful Improvements in Harrows and Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the class of harrows and cultivators designed more particularly for the cultivation of cotton and other crops planted in rows or ridges, and it is intended to loosen the earth along the rows, to dig up and remove the grass and weeds, and to throw the loose earth back to the plants.

It consists in a harrow or cultivator constructed to straddle the row, and provided with two sets of adjustable blades attached to the teeth, so arranged that the front blades will uproot and remove the grass and weeds from the plants beyond the line of the teeth, and the rear blades will take up the earth loosened by the teeth and deposit it around the roots of the plants.

Figure 1:
Figure 2:
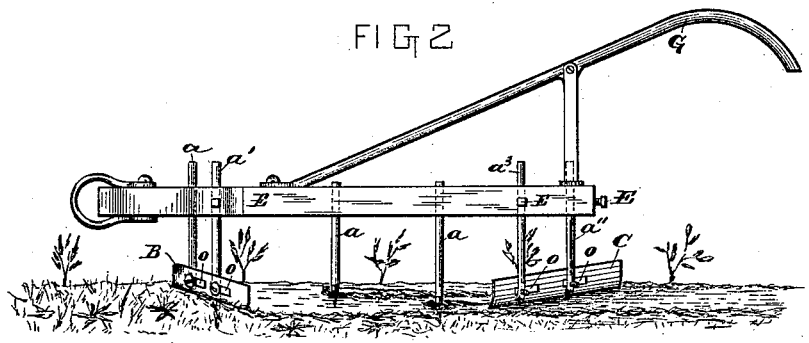
Figure 3:
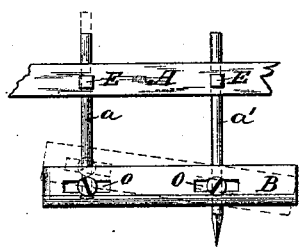

In the drawings, Figure 1 is a plan view of my invention. Fig. 2 is a side elevation, showing the blades or scrapers and the manner in which they are attached to the teeth. Fig. 3 is a section, showing the front blade and the means by which it is adjusted.

A is the frame of the harrow, which is V-shaped or triangular in form, although any other suitable form may be adopted. *a* represents the harrow-teeth. B are the front blades or scrapers, and C the rear blades. The teeth are arranged in the side pieces of the frame, so that when the cultivator is astraddle of the row the front teeth on either side will occupy a position close along the line of plants, and the succeeding teeth will cover the remaining surface along the sides of the ridge or row.

The front blade, B, on either side is attached to the front tooth by a bolt inserted through the tooth and front end of the blade, and the opposite end of the blade is secured in a similar manner to an outer auxiliary tooth, $a'$, fixed in a projection, F, of the main frame, a little to the rear of the front tooth, so that the blades will occupy a diagonal position toward the rear, and their outer ends will extend a trifle beyond the line of the outer cutting-tooth of the harrow, as shown in Fig. 1. The rear blades, C, are similar in construction to the others, and are attached in the same manner, except that they occupy an opposite diagonal position, their rear ends converging toward the center of the rear of the harrow, where they are bolted to the teeth $a''$ in the cross-piece D, and extend thence forward and outward to the rear side teeth, $a^3$, so that a continuation of their line would form an acute angle with the line of the front blades. The bolts confining the blades to the teeth pass through longitudinal slots $o$ in the blades, thereby rendering the latter capable of longitudinal adjustment, in order that a proper distance may be maintained between their inner ends and the plants. The blades are also rendered vertically adjustable by means of the set-screws E, with which each of their supporting-teeth is provided, and either end of each blade may be raised or lowered independently to correspond with the slope of the surface over which it is designed to operate.

The operation of my harrow is as follows: It is placed astraddle of the row, so that the plants will occupy a line between the converging ends of the front and rear blades, the latter being first adjusted longitudinally and vertically to correspond with the surface of the ground and the size of the plants, and the team is started. The front blades, which are provided with a sharp cutting-edge slightly curved outwardly, serve to root out and remove all grass and weeds along the row and deposit them outside the line of teeth. The teeth which are between the front and rear blades tear up and pulverize the soil, and the rear blades, which are adjusted to a slightly lower plane than the front, take up the soil and deposit it along the roots of the plants at the top of the ridge.

It will be observed that the outer ends of the front blades extend beyond those of the rear, so that the grass and weeds are removed beyond the reach of the rear blades.

I prefer to extend the points of the two front supporting-teeth only beyond the edge of the blades; but all the others may be so extended, if deemed desirable.

When my harrow is used for the purpose of replanting where the stand is bad, as is frequently the case with cotton, I remove the front blades, having first scattered the seed along the top of the row. The rear scrapers will then gather up the seed and deposit it along the row in line with the other plants, at the same time covering it with soil. The depth to which the seed is covered may be regulated by pressing the rear blades into the soil by means of the handles or shafts G, causing them to take up a large or small amount of soil, and thereby covering the seed to any required depth.

My cultivator may be easily operated by a single horse by providing a suitable shaft attachment, whereby the horse is enabled to walk between the rows.

I am aware that cotton-cultivators provided with scrapers for removing the grass and weeds and throwing the soil back to the plants have been heretofore used and are not new, and I do not claim this, broadly; but

What I claim, and desire to secure by Letters Patent, is—

In a harrow or cultivator, the front blades or scrapers, B, attached to the front teeth, and made both longitudinally and vertically adjustable by means of the slots o and set-screws E, the rear scrapers, C, adjustably attached to the rear teeth, and the intermediate teeth, a, all combined and arranged substantially as described, and for the purpose specified.

In testimony whereof I affix my signature in presence of two witnesses.

SIMON LAMBETH COGGIN.

Witnesses:
H. M. SULLIVAN,
W. E. ANDREWS.